June 10, 1930.  H. H. STRONG  1,762,803
PROJECTION APPARATUS
Filed June 27, 1927  5 Sheets-Sheet 1

Inventor
Harry H. Strong
By Smith and Freeman
Attorneys

Inventor
Harry H. Strong
By Smith and Freeman
Attorneys

June 10, 1930. H. H. STRONG 1,762,803
PROJECTION APPARATUS
Filed June 27, 1927 5 Sheets-Sheet 3

Inventor
Harry H. Strong
By Smith and Freeman
Attorneys

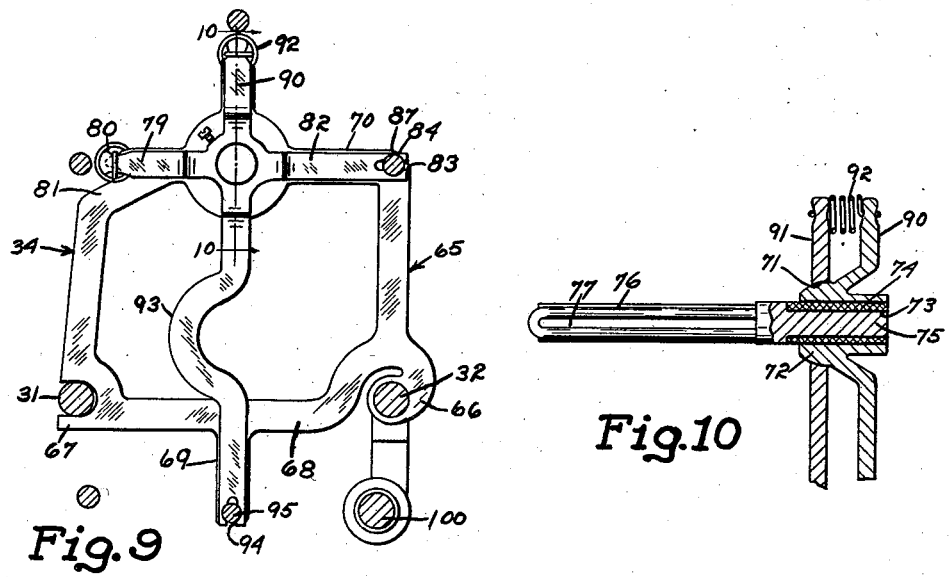
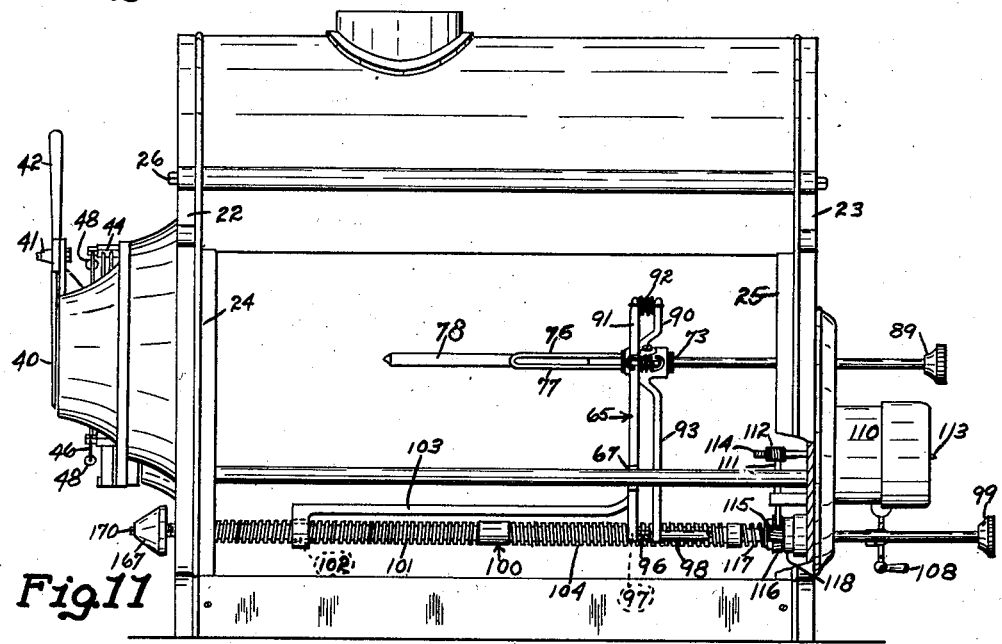
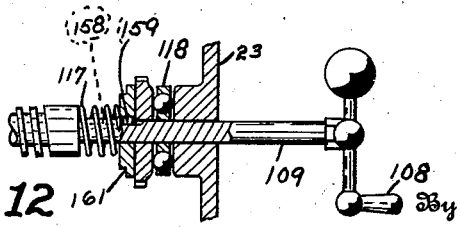

June 10, 1930.  H. H. STRONG  1,762,803
PROJECTION APPARATUS
Filed June 27, 1927   5 Sheets-Sheet 5

Inventor
Harry H. Strong
By Smith and Freeman
Attorneys

Patented June 10, 1930

1,762,803

UNITED STATES PATENT OFFICE

HARRY H. STRONG, OF TOLEDO, OHIO, ASSIGNOR TO THE STRONG ELECTRIC CORPORATION, OF WILMINGTON, DELAWARE, A CORPORATION OF DELAWARE

PROJECTION APPARATUS

Application filed June 27, 1927. Serial No. 201,910.

My invention relates to projection apparatus, and particularly to lamps for projecting both motion picture and stereopticon slides, and the principal object of my invention is to provide a new and improved lamp of this type. In the drawings accompanying this specification and forming a part of this application I have shown, for purposes of illustration, one form which my invention may assume, and in these drawings:

Figure 9 is a fragmentary section on the line 9—9 of Figure 4 showing the rear carbon support;

Figure 10 is a fragmentary section on the line 10—10 of Figure 9 showing the connection between the rear carbon holder and the supporting frame therefor;

Figure 11 is a view similar to Figure 4 omitting parts to show more clearly the rear carbon operating and adjusting mechanism, and the carbon operating mechanism;

Figure 12 is a detail showing the connection between the hand and motor drives for the carbon operating mechanism;

Figure 16 is a fragmentary view combining the disclosure of Figures 8 and 11 and showing the parts in the position for stereopticon projection, while

Figure 1:
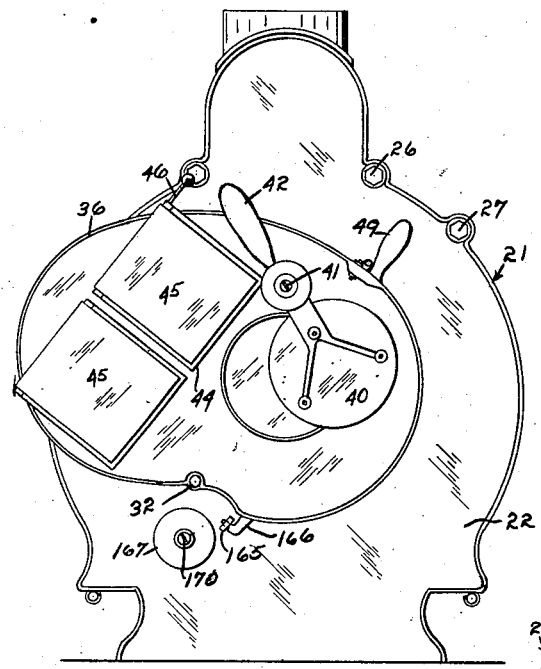
Figure 1 is a front end elevation of the embodiment of my invention illustrated herein showing the device in position for the projection of motion-pictures.

The lamp herein shown is enclosed in a housing 21 comprising front and rear end plates 22 and 23 provided with flanges 24 and 25 and united by suitable tierods 26 and 27, a top 28 extending between the front and rear end plates 22 and 23 secured to the flanges 24 and 25 and further uniting the front and rear end plates 22 and 23, side bases 29 also extending between the front and rear end plates 22 and 23 secured to the flanges 24 and 25 and further uniting the front and rear end plates 22 and 23, doors 30 pivoted on the tierods 27 and normally closing the space on the housing 21 between the lower edge of the top 28 and the upper edge of the corresponding side base 29, and a pair of carrier rods 31 and 32 secured to the front and rear end plates 22 and 23, additionally uniting the front and rear end plates 22 and 23, and reciprocably supporting a front carbon holder assembly 33, a rear carbon holder assembly 34, and a reflector assembly 35.

Figure 2:
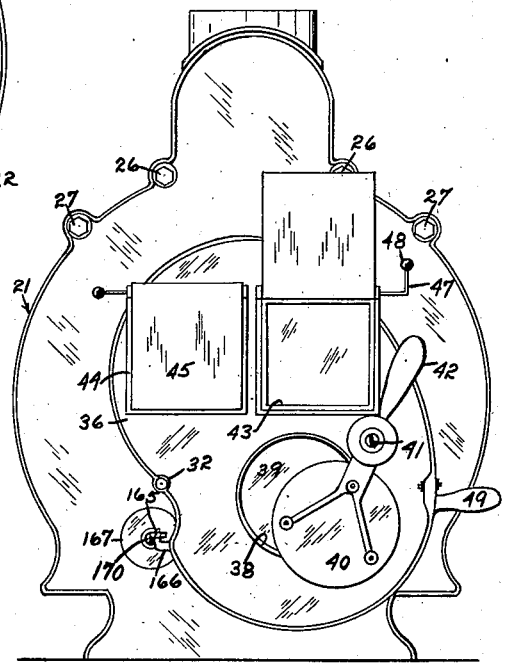
Figure 2 is a view similar to Figure 1 showing the device in position for the projection of stereopticon slides.
Figure 3:
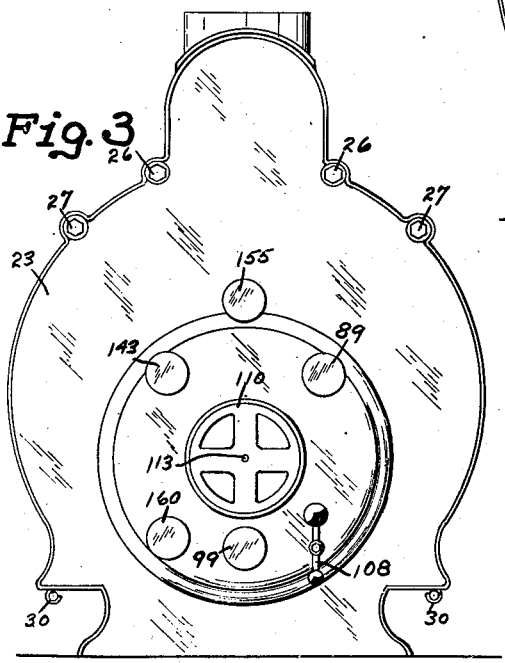
Figure 3 is a rear end elevation.
Figure 4:
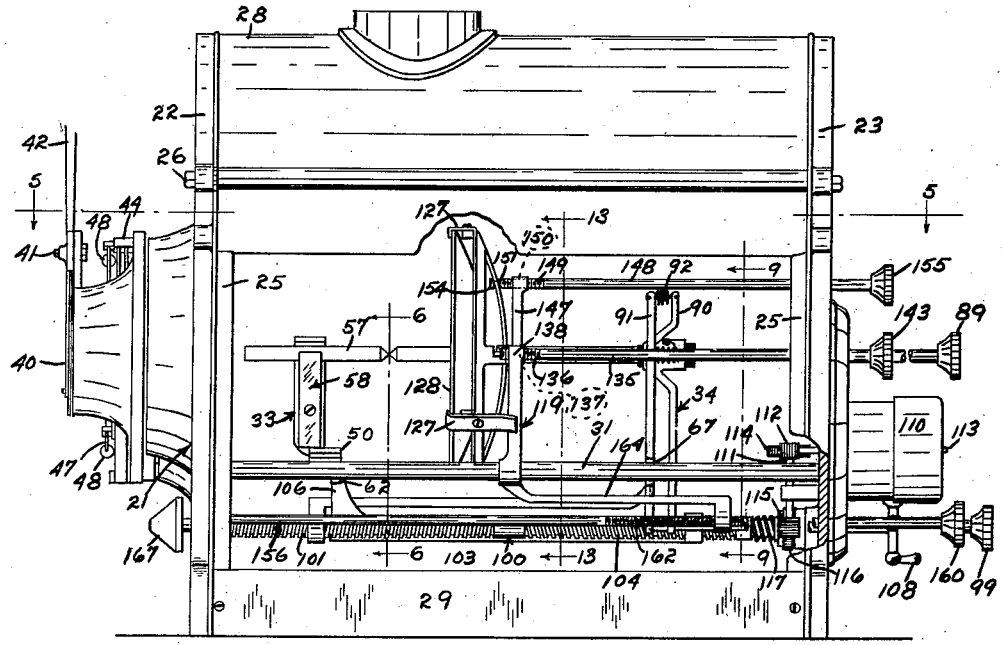
Figure 4 is a side elevation taken from the right in Figures 1 and 2, and from the left in Figure 3.
Figure 5:
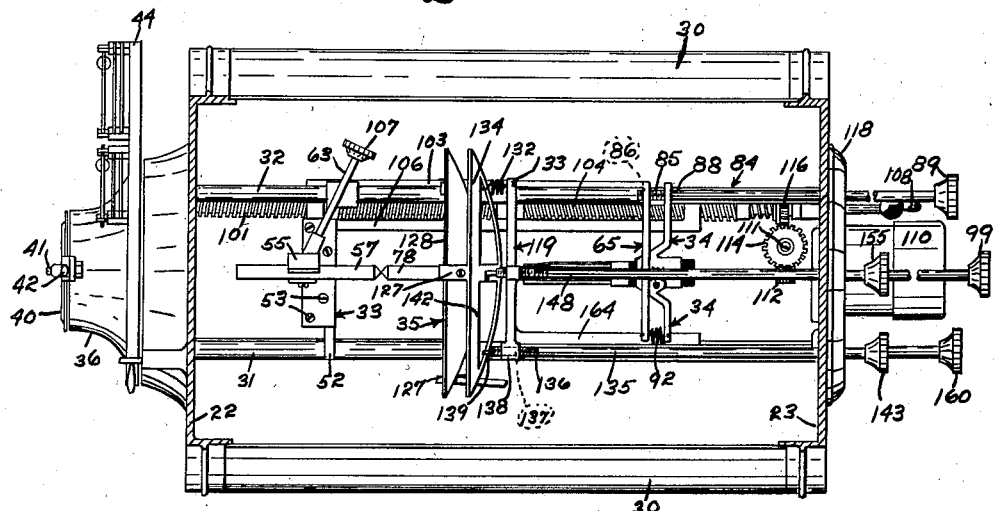
Figure 5 is a horizontal section taken on the line 5—5 of Figure 4.

Pivoted to the end of the carrier rod 32 forwardly of the front end plate 22 is a nose 36 overlying the projection aperture 37 in the front end plate 22, provided with a motion picture projection aperture 38 containing a lens 39 and adapted to be closed by means of a plate 40 pivoted to the nose 36 at 41 and operable by means of a handle 42, provided also with a pair of apertures 43 for stereopticon projection each having alined therewith a suitable slide holder 44 and each adapted to be closed by means of a plate 45 secured to a shaft 46 pivoted in the corresponding slide holder 44 and operable by means of a handle 47 provided with a weight 48 effective to hold the plate 45 in either extreme position to which it has been moved, and movable about the carrier rod 32, and by means of a suitable handle 49, between the position shown in Figure 1 wherein the motion picture projecting aperture 38 is alined with the front end plate aperture 37 and the position shown in Figure 2 wherein the stereopticon projecting apertures 43 are alined with the front end plate aperture 37.

The front carbon holder assembly 33 comprises a base 50 provided at one side with an ear 51 encircling the carrier rod 32, and at the other side with a fork 52 embracing the carrier rod 31, and carries secured thereto by suitable machine screws 53 a plate 54 from which rises a carbon supporting post 55 provided with a recess 56 in which the front carbon 57 is held firmly clamped in position by means of a strap 58 secured intermediate its end by means of a machine screw 59 to the carbon supporting post 55 and acting to clamp the carbon 57 by movement of its upper end 60 toward the carbon supporting post 55 and the carbon 57 as its lower end 61 is forced away from the carbon supporting post 55 by the action of the tip 62 of a pin 63 screw-threadedly engaging within a cooperatingly screw-threaded tube 64 carried by the plate 54, positioned with its tip 62 bearing against the lower end 61 of the strap 58, and operated by means of a conveniently positioned handle 171.

The rear carbon holder assembly 34 comprises a substantially square frame 65 provided at one lower corner with an ear 66 encircling the carrier rod 32, and at the other lower corner with a fork 67 embracing the carrier rod 31, provided intermediate its lower side 68 with a downwardly depending lug 69, and intermediate its upper side 70 with a segmental spherical recess 71 receiving and supporting for universal movement a cooperating segmental sphere 72 seated within the segmental spherical recess 71 and provided centrally with an aperture 73 in which is mounted an insulating sleeve 74 surrounding a rear carbon holder base 75 carrying projecting from the forward end thereof carbon gripping fingers 76 and 77 effective to support between them the rear carbon 78.

The segmental sphere 72 is held in position seated in the segmental spherical recess 71, and the segmental sphere 72 and rear carbon 78 are angularly adjusted relative to the frame 65 to aline the rear carbon 78 with the front carbon 57, by two separate and independent adjusting means operating together to secure the segmental sphere 72 seated within the segmental spherical recess 71, operating one to adjust the rear carbon 78 about a substantially vertical axis and the other to adjust the rear carbon 78 about a substantially horizontal axis, and the two therefore operating to provide a universal adjustment of the rear carbon 78 to permit movement of the rear carbon 78 in any direction.

The mechanism for adjusting the carbon holding segmental sphere 72 about the substantially vertical axis comprises an arm 79 extending laterally from the segmental sphere 72, a tension spring 80 extending between the end of the arm 79 and the adjacent upper corner 81 of the frame 65, an arm 82 extending laterally from the segmental sphere 72 in the opposite direction from the arm 79 and provided at its end with a slot 83, and an adjusting rod 84 provided at its end with a section 85 screw-threaded to cooperate with a correspondingly screw-threaded aperture 86 in the upper corner 87 of the frame 65, provided with a reduced section 88 received within the slot 83 in the arm 82, reciprocable through a suitable aperture in the rear end plate 23 to permit reciprocation of the rear carbon holder assembly 34 along the carrier rods 31 and 32, provided at its rear end with an operating handle 89, and effective to draw the arm 82 toward the frame 65 against the action of the tension spring 80 until the rear carbon 78 has assumed the desired lateral position; while the mechanism for adjusting the segmental sphere 72 about the substantially horizontal axis comprises an arm 90 extending upwardly from the segmental sphere 72, an arm 91 extending upwardly from the upper side 70 of the frame 65, a tension spring 92 extending between the arm 90 and the arm 91, an arm 93 extending downwardly from the segmental sphere 72 and provided at its lower end with a slot 94, and a rod 95 provided at its end with a screw-threaded section 96 adapted to engage a cooperating screw-threaded aperture 97 in the arm 69 projecting downwardly from the lower side of the frame 65, provided with a reduced extension 98 received within the slot 94 of the arm 93, reciprocable through a suitable aperture in the rear end plate 23 to permit reciprocation of the rear carbon assembly 34, provided at its rear end with an operating handle 99, and effective to draw the segmental-sphere arm 93 toward the frame arm 69 to thus swing the rear carbon 78 upwardly against the action of the tension spring 92 until the rear carbon 78 has assumed the desired vertical position.

The front and rear carbon assemblies 33 and 34 are reciprocated along the carrier rods 31 and 32 to effect approach and recession of the front and rear carbons 57 and 78 by means of a screw unit 100 rotatably and reciprocably mounted in the front and rear end plates 22 and 23, provided over its forward portion with a left-hand-screw section 101 engaging within a cooperatingly screw-threaded aperture 102 in an arm 103 extending downwardly and forwardly from the rear carbon supporting frame 65, provided over its rear portion with a right-hand-screw section 104 engaging within a cooperatingly screw-threaded aperture 105 formed in an arm 106 extending downwardly and rearwardly from the base 50 of the front carbon holder assembly 33, directly operable by means of a handle 108 secured to an extension 109 projecting rearwardly through the rear end plate 23 supporting the screw unit 100 from the rear end plate 23, and impositively operable, through a friction disc 161 splined to the extension 109 rotatable with the extension 109 but reciprocable thereon by means of a key 159 projecting from the friction disc 161 into an elongated keyway 158 in the extension 109, by means of an electric motor 110 connected to the screw unit 100 by an intermediate shaft 111 which is driven from the motor 110 by a worm 112 carried on the motor shaft 113 engaging a cooperating worm gear 114 carried on the upper end of the intermediate shaft 111, and which drives through a worm 115 carried on the lower end of the intermediate shaft 111 engaging a cooperating worm gear 116 rotatable on the extension 109 of the screw unit 100 but held in frictional engagement with the friction disc 161 by means of a spring 117 compressed between the friction disc 161 and the rear end of the section 104 of the screw unit 100 and tending both to clamp the worm gear 116 between the friction disc 161 and a ball-bearing unit 118 interposed between the worm gear 116 and the inner face of the rear end plate 23 to eliminate friction between the worm gear 116 and the rear end plate 23, and also to bias the screw unit 100 toward, and normally maintain the screw unit 100 in, extreme forward reciprocal position.

It will be understood by those skilled in the art that the handle 108 will ordinarily be used in striking and adjusting the arc, and that thereafter the motor 110, controlled in any suitable manner, will operate to maintain the arc in proper adjustment.

The reflector assembly 35 comprises a substantially square frame 119 provided at one lower corner with an ear 120 encircling the carrier rod 31, and at the other lower corner with a fork 121 embracing the carrier rod 32, and provided intermediate its upper side 122 with a segmental spherical recess 123 supporting a cooperating segmental sphere 124 universally movable within the segmental spherical recess 123, provided centrally with an aperture 125 for the free passage of the rear carbon 78, and carrying, by means of a spider 126, and fingers 127, a reflector 128 provided with a central aperture 129 for the passage of the rear carbon 78, held in position against the overhanging ends 130 of the fingers 127 by means of a spring holding finger 131 secured to the spider 126 engaging the rear face of the reflector 128 and acting to move the reflector 128 forward against the over-hanging ends 130 of the fingers 127, adapted with the arc between the front and rear carbons 57 and 78 in one position to focus the light from the arc onto the lens 30 carried in the aperture 38 of the nose 36, and adapted with the arc in another position to reflect the light from the arc as a parallel beam illuminating the stereopticon projecting apertures 43 of the nose 36.

The segmental sphere 124 is held in position within the segmental spherical recess 123, and the segmental sphere 124 and the reflector 128 are adjusted universally relative to the reflector frame 119, by means of two separate and independent adjusting means together effective to hold the segmental sphere 124 seated within the segmental spherical recess 123, operating one to adjust the reflector 128 about a substantially vertical axis and the other to adjust the reflector 128 about a substantially horizontal axis, and the two serving to provide conjointly universal adjustment of the reflector 128 upon the reflector assembly frame 119.

The mechanism for adjusting the reflector 128 about the substantially vertical axis comprises a tension spring 132 extending between the upper corner 133 of the frame 119 and the adjacent arm 134 of the spider 126, and a rod 135 provided with a screw-threaded section 136 engaging within a cooperatingly screw-threaded aperture 137 formed in the upper corner 138 of the frame 119, provided with a reduced extension 139 extending through a slot 140 in the adjacent arm 141 of the spider 126 and terminating in a head 142 overlying the forward face of the spider arm 141 adjacent the slot 140, reciprocable through a suitable aperture in the rear end frame 23 to permit adjusting reciprocation of the reflector assembly 35, operable by means of a handle 143 disposed rearwardly of the rear end plate 23, and effective to draw the arm 141 of the spider 126 toward the upper corner 138 of the frame 119 against the action of the tension spring 132 to thus swing the reflector 128 about a substantially vertical axis until it has assumed the desired lateral position; while the mechanism for adjusting the reflector 128 about the substantially horizontal axis comprises a tension spring 144 extending between the lowest portion of the rim 145 of the spider 126 and the center of the lower cross bar 146 of the frame 119, an arm 147 extending upwardly from the central portion of the upper cross bar 122 of the frame 119, and a rod 148 provided with a screw-threaded section 149 engaging within a cooperatingly screw-threaded aperture 150 formed in the end of the arm 147, provided with a reduced extension 151 extending through a slot 152 in an arm 153 of the spider 126 and terminating in an enlarged head 154 overlying the inner face of the spider arm 153 adjacent the slot 152, reciprocable through a suitable aperture in the rear end plate 23 to permit adjusting reciprocation of the reflector 128, provided at its rear end with an operating handle 155, and effective to draw the arm 153 of the spider 126 toward the arm 147 of the frame 119 to thus swing the reflector 128 upwardly against the action of the tension spring 144 until the reflector 128 has assumed the desired vertical position.

The reflector 128 is adjusted along the carrier rods 31 and 32 to properly focus the light upon the lens 39 by means of a control rod 156 rotatably mounted in the front and rear end plates 22 and 23, extending rearwardly of the rear plate 23, provided on its rear end with an operating handle 160, provided with a screw-threaded section 162 engaging a cooperatingly screw-threaded aperture 163 in an arm 164 extending downwardly and rearwardly from the frame 119 of the reflector assembly 35, and operable to adjust the reflector 128 by reciprocation of the frame 119 and reflector 128 produced by rotation of the control rod 156 through the coaction of the screw-threaded section 162 of the rod 156 and the cooperatingly screw-threaded aperture 163 in the arm 164 of the reflector assembly 35.

Figures 6, 7:
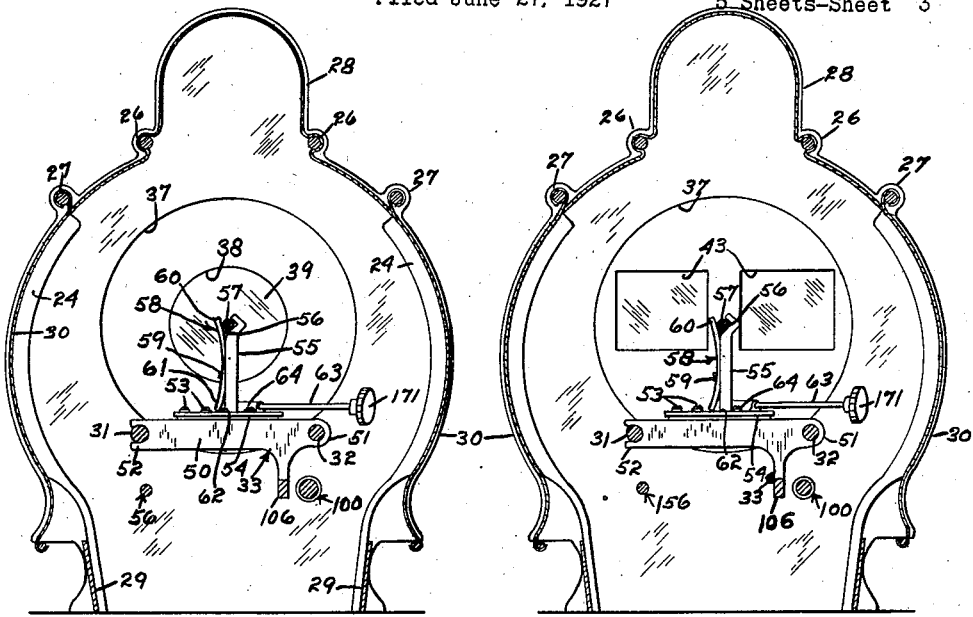
Figure 6 is a section taken on the line 6—6 of Figure 4, showing particularly the front carbon holder and the interior of the nose, and showing the front carbon holder and the nose in motion picture projecting position.
Figure 7 is a view similar to Figure 6 but showing the front carbon holder and the nose in stereopticon projecting position.
Figure 8:
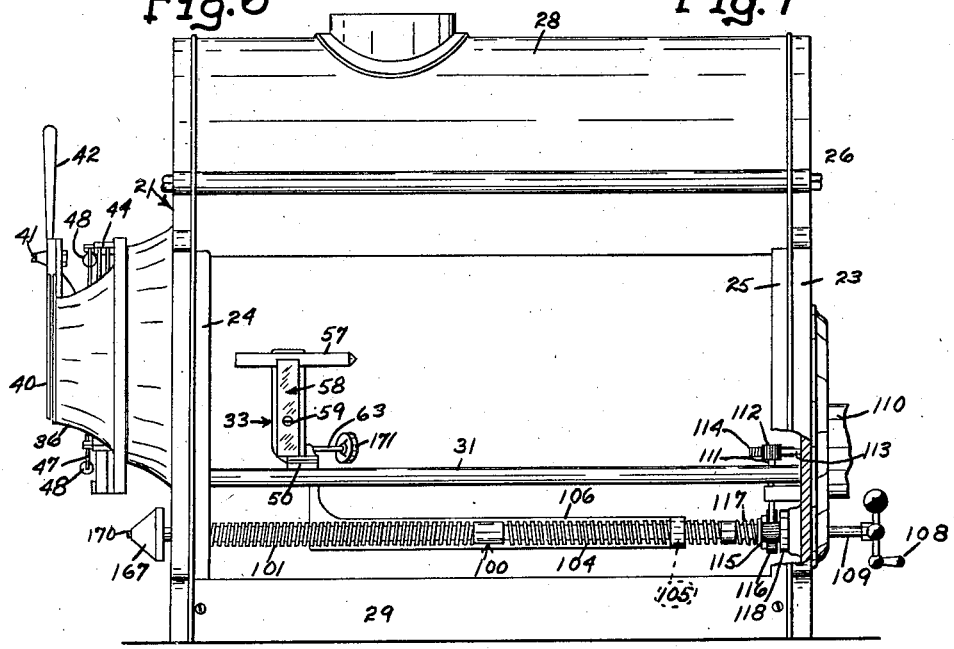
Figure 8 is a view similar to Figure 4 omitting parts to show more clearly the front carbon supporting and operating means, and the carbon operating mechanism.
Figure 13:
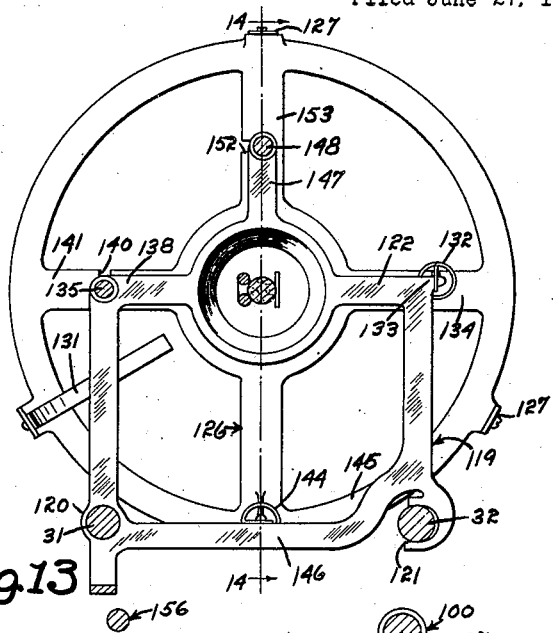
Figure 13 is a section on the line 13—13 showing the reflector and reflector support.
Figure 14:
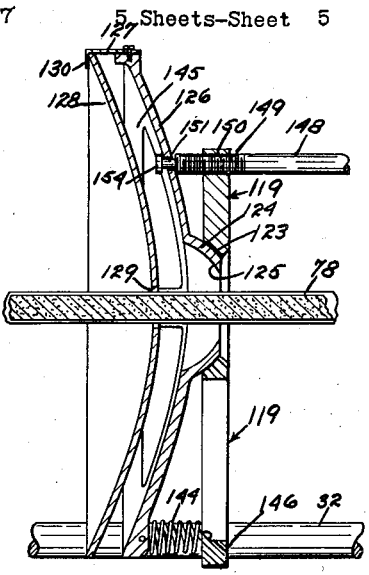
Figure 14 is a section on the line 14—14 of Figure 13.
Figure 15:
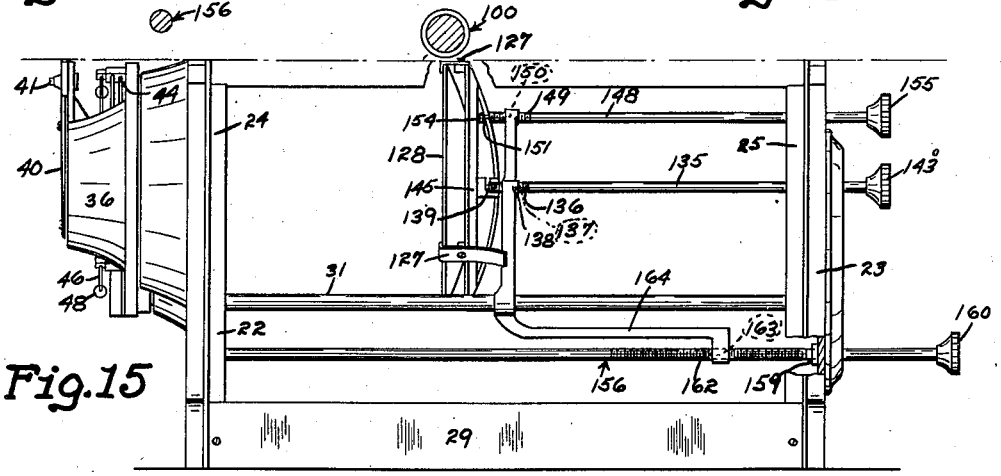
Figure 15 is a fragmentary view similar to Figure 4 omitting parts to show more clearly the reflector support and adjustment.
Figure 16:
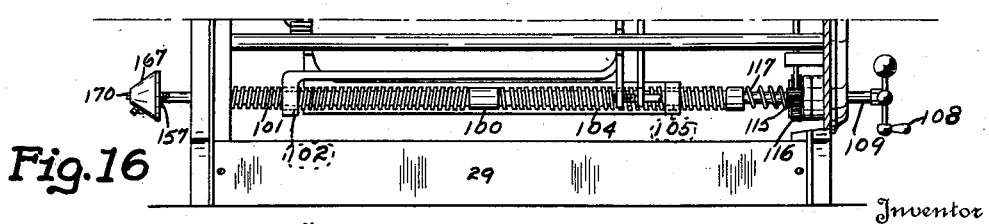
Figure 17:
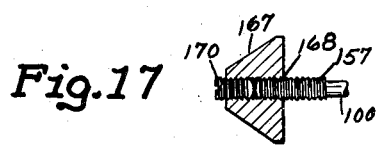
Figure 17 is a detail showing the means for adjusting the throw of the arc between motion picture projection position and stereopticon projecting position.

The embodiment of my invention herein shown comprises also a roller 165 rotatably mounted upon a bracket 166 depending from the lower edge of the nose 36, swinging with the nose 36, and effective, when the nose 36 is moved into stereopticon projecting position, as shown in Figures 2 and 7, to retract the arc, from the beam focusing motion picture projecting position shown in Figures 1 and 6 and 15 to the parallel beam stereopticon projecting position shown in Figures 2 and 7 and 16, by reciprocation of the screw unit 100 against the action of the compression spring 117 effected by engagement of the roller 165 with a cone 167 provided with a screw-threaded aperture 168 engaging the cooperatingly screw-threaded extension 157 of the screw unit 100, adjustable by coaction of the screw-threaded extension 157 and the screw-threaded aperture 168 to vary the position of the cone 167 upon the extension 157 of the screw unit 100, and therefore to vary the throw or shift of the arc to that throw or shift proper under the particular projection conditions under which the lamp may be operating, and held in adjusted position by means of a lock screw 170 insertable within the screw-threaded aperture 168 of the cone 167 into binding and locking engagement with the end of the extension 157 of the screw unit 100.

It will of course be understood that upon retraction of the nose 36 into motion picture projecting position the screw unit 100, and the arc will be returned by the spring 117 exactly to beam focusing motion picture projection position without further adjustment.

From the above description it will be obvious to those skilled in the art that I have provided a lamp for the projection of motion pictures and stereopticon slides embodying and providing improved light beam producing mechanism, improved reflector adjusting mechanism, and improved rear carbon adjusting mechanism, and accordingly it will be obvious to those skilled in the art that I have provided a lamp accomplishing at least the principal object of my invention. At the same time it also will be obvious to those skilled in the art that the particular embodiment of my invention herein shown and disclosed embodies advantages other than those particularly pointed out or suggested herein, and also that this particular embodiment of my invention may be variously changed and modified without sacrificing these advantages or departing from the spirit of my invention, and it therefore will be understood that the disclosure herein is illustrative only, and that my invention is not limited thereto.

I claim:

1. Projection apparatus comprising: a housing; and movable light-beam-producing mechanism disposed within said housing, comprising movable light-producing means, comprising also reflector means cooperating with said light-producing means to produce a light beam, and variable by movement of said light-producing means to vary the focus of said light beam between a beam suitable for cinematographic projection and a beam suitable for stereopticon projection.

2. Projection apparatus comprising: a housing; and movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection.

3. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection; and means to effect a fixed movement of said light-producing means variable to correspond to projection conditions.

4. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection; and movable nose mechanism connected to said housing, provided with a first opening for the passage of light therethrough for cinematographic projection and with a pair of openings for the passage of light therethrough for stereopticon projection, and movable between a position in which said first opening is in operative relation to said light beam and a position in which said pair of openings are in operative relation to said light beam.

5. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection; movable nose mechanism connected to said housing, provided with a first opening for the passage of light therethrough for cinematographic projection and with a pair of openings for the passage of light therethrough for stereopticon projection, and movable between a position in which said first opening is in operative relation to said light beam and a position in which said pair of openings are in operative relation to said light beam; and means for effecting a fixed movement of said light producing means variable to correspond to projection conditions.

6. Projection apparatus comprising: a housing; movable light-beam-producing mechanism disposed within said housing, comprising movable light-producing means, comprising also reflector means cooperating with said light-producing means to produce a light beam, and variable by movement of said light-producing means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

7. Projection apparatus comprising: a housing; movable light - beam - producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

8. Projection apparatus comprising: a housing; movable light - beam - producing mechanism disposed within said housing, comprising movable light-producing means, comprising also reflector means cooperating with said light-producing means to produce a light beam, and variable by movement of said light producing means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms automatically effects such movement of the other of said mechanisms.

9. Projection apparatus comprising: a housing; movable light - beam - producing mechanism disposed within said housing, comprising light-producing means, comprising also reflector means cooperating with said light-producing means to produce a light-beam, said light-producing means being movable toward and from said reflector means, and said light-beam-producing mechanism being variable by approach and recession of said light-producing means toward and from said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of one of said mechanisms automatically effects such movement of the other of said mechanisms.

10. Projection apparatus comprising: a housing; movable light-beam-producing mechanism disposed within said housing, comprising movable light-producing means, comprising also reflector means cooperating with said light-producing means to produce a light beam, and variable by movement of said light producing means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism automatically effects such movement of said light-producing means.

11. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam; movable nose mechanism connected to said housing, provided with a pair of openings for the passage of light therethrough, and movable between a position in which one of said openings is in operative relation to said light beam and a position in which the other of said openings is in operative relation to said light beam; and means whereby such movement of said nose mechanism automatically effects such movement of said light-beam-producing mechanism.

12. Projection apparatus comprising: a housing; movable light-beam-producing mechanism disposed within said housing, comprising movable light-producing means, comprising also reflector means cooperating with said light-producing means to produce a light beam, and variable by movement of said light-producing means to vary the focus of said light beam between a beam suitable for cinematographic projection and a beam suitable for stereopticon projection; movable nose mechanism connected to said housing, provided with a first opening for the passage of light therethrough for cinematographic projection and with a second opening for the passage of light therethrough for stereopticon projection, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

13. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection; movable nose mechanism connected to said housing, provided with a first opening for the passage of light therethrough for cinematographic projection and with a second opening for the passage of light therethrough for stereopticon projection, and movable between a position in which one of said openings is in operative relation to said light beam and a position in which the other of said openings is in operative relation to said light beam; and means whereby such movement of one of said mechanisms will automatically be accompanied by such movement of the other of said mechanisms.

14. Projection apparatus comprising: a housing; movable light-beam-producing mechanism disposed within said housing, comprising light-producing means, comprising also reflector means cooperating with said light-producing means to produce a light beam, said light-producing means being movable toward and from said reflector means, and said light-beam-producing mechanism being variable by approach and recession of said light-producing means toward and from said reflector means to vary the focus of said light beam between a beam suitable for cinematographic projection and a beam suitable for stereopticon projection; movable nose mechanism connected to said housing, provided with a first opening for the passage of light therethrough for cinematographic projection and with a pair of openings for the passage of light therethrough for stereopticon projection, and movable between a position in which said first opening is in operative relation to said light beam and a position in which said pair of openings are in operative relation to said light beam; and means whereby such movement of one of said mechanisms will automatically be accompanied by such movement of the other of said mechanisms.

In testimony whereof I hereunto affix my signature.

HARRY H. STRONG.